United States Patent [19]

Jan et al.

[11] Patent Number: 4,509,788

[45] Date of Patent: Apr. 9, 1985

[54] SAFETY ARRANGEMENT IN A TAXI

[76] Inventors: Ping-Shuenn Jan, No. 33-9, Pu-Tzu, Pu-Yun Tsun, Yung-Kang Hsiung, Tainan Hsieng; Chung-Yieh Hong, No. 9, Lane 493, Yen-Ping I Rd., Ku-Shan Li, Chi-Shan Cheng, Kao-Hsiung Hsieng, both of Taiwan

[21] Appl. No.: 449,621

[22] Filed: Dec. 14, 1982

[51] Int. Cl.³ ............................................. B60R 27/00
[52] U.S. Cl. .................................. 296/24 R; 280/749; 296/169
[58] Field of Search ............. 280/748, 749; 296/24 R, 296/165, 169

[56] References Cited

U.S. PATENT DOCUMENTS

| 2,676,839 | 4/1954 | Lacoste | 296/169 |
| 3,044,821 | 7/1962 | Wicker | 296/24 R |
| 3,240,527 | 3/1966 | Weiss et al. | 296/24 R |
| 3,397,005 | 8/1968 | May et al. | 296/24 R |
| 3,549,195 | 12/1970 | Kallinikos | 296/24 R |
| 4,227,735 | 10/1980 | Joyner | 296/24 R |
| 4,411,465 | 10/1983 | Stuart | 296/24 R |

Primary Examiner—Richard A. Bertsch
Attorney, Agent, or Firm—Birch, Stewart, Kolasch & Birch

[57] ABSTRACT

A safety arrangement for taxi driver seat comprises, a seat with an adjustable back, a side partition member fixedly mounted on the floor and secured to the top of the car body at one side of the seat, a back partition member releasably attached to the top of the car body at the back of the seat and coupled with the adjustable back, and fastener for releasably fastening the adjacent sides of the side and back partition members. Each of the partition members includes a hollow-wall like framework at the lower portion and a transparent member affixed to the upper side of the hollow-wall like framework. The hollow wall like framework is advantageously provided with air ventilation holes and a window for paying the taxi fee.

7 Claims, 4 Drawing Figures

SAFETY ARRANGEMENT IN A TAXI

BACKGROUND OF THE INVENTION

The present invention relates to a safety arrangement in a taxi, and more particularly to an arrangement for isolating the driver seat from the seats of the passengers so as to avoid robbery, etc, between the driver and the passengers.

It is known that, in many cases, taxis have taken the place of passenger buses because they are more convenient and require less waiting time. Nevertheless, there frequently arises situations in taxi cabs wherein drivers commit crimes against passengers and vice versa, such as robbery, rape and even murder. It is desirable to avoid such problems by modifying the construction of conventional taxis.

SUMMARY OF THE INVENTION

It is a general object of the present invention to provide an arrangement in a taxi that isolates the driver seat from the passenger seats so as to eliminate the above described disadvantages.

It is another object of the present invention to provide an arrangement in a taxi for partitioning the driver's seat from the passengers seats so that disturbances by the passengers will not disturb the driver's attention while he is driving.

It is a further object of the present invention to provide an arrangement that can convert the driver's seat into a comfortable couch when he wants to take a rest.

According to the present invention, an arrangement for the driver's seat of a taxi comprises, a seat with a back, partition means fixedly mounted on the floor and secured to the top of the car body, the partition means extending from the back to the side of the seat for isolating the seat from the other seats of the passengers, the partition means including a hollow wall like framework at the lower portion thereof and a transparent member affixed to the upper side of the hollow wall like framework, the framework being provided with air ventilation holes and windows for payment of the taxi fee.

Advantageously, the partition means is separated into back partition and side partition members which are releasably interconnected at the adjacent sides thereof by means of fasteners.

The arrangement is advantageously constructed such that the back of the seat is adjustable to rotate in the backward direction. In this case, the back partition member has its lower portion attached to the adjustable back of the seat and its upper portion releasably attached to the top of the car body, whereby the back and back partition member can be lowered in the backward direction so that the driver can be provided with a back-rest.

These and other objects, features and advantages of the present invention will be more apparent in the following description of a preferred embodiment with reference to the accompanying drawings.

DETAILED DESCRIPTION OF THE EMBODIMENT

Figure 1:
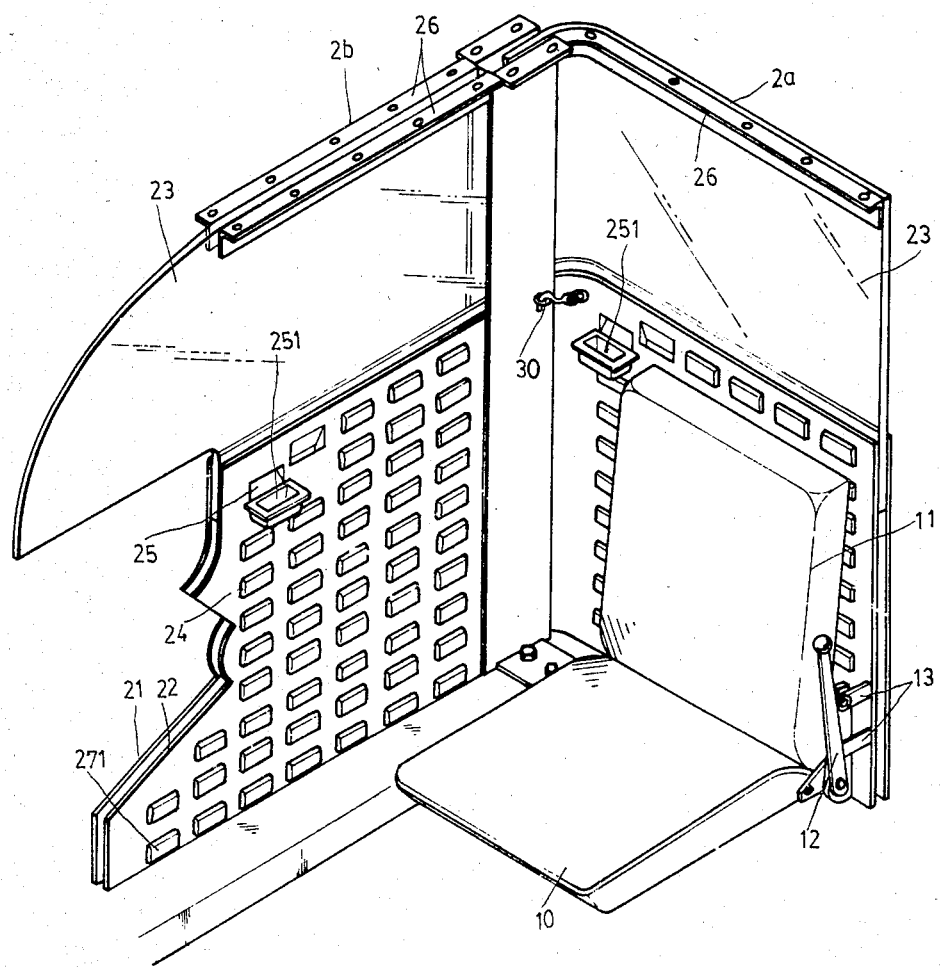
FIG. 1 is a schematic view of an arrangement embodying the present invention.
Figure 2:
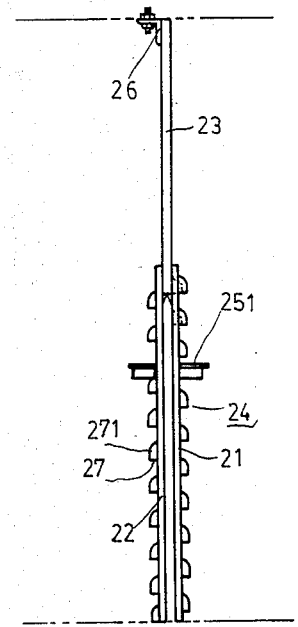
FIG. 2 is a fragmentary view showing a partition member.

Referring now to FIGS. 1 and 2, there is shown an embodiment of the invention which includes a seat 10 having an adjustable back 11 operable by a lever 12. There are further provided two rigid partition members 2a and 2b respectively at the back and left side of the seat 10. Each of the partition members 2a and 2b comprises an upper transparent rigid member 23 which can be made of plexiglass and a lower body 24. The lower body 24 is constructed into a hollow wall-like framework with two board members 21 and 22, such as fiber reinforced boards or metal plates. The lower end of the upper transparent member 23 is affixed to the lower body 24 and the upper end thereof is provided with the connecting plates 26 adapted to be secured to the top of the car body such as by means of screws.

There are further provided air ventilation holes 27 in the lower body 24 which are provided with outwardly inclining members 271 so as to avoid the intrusion of any type of device or weapon through the lower body member 24. Two windows 25 are also provided in each side of the lower body 24. Adjacent to the two windows 25 are provided two trays 251 for receiving the taxi fees or exchanging written communications.

Figure 3:
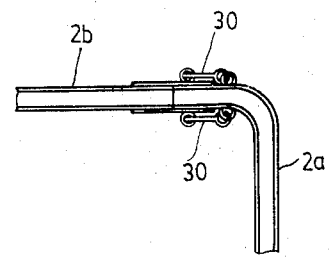
FIG. 3 illustrates how the first and second partition members are coupled.
Figure 4:
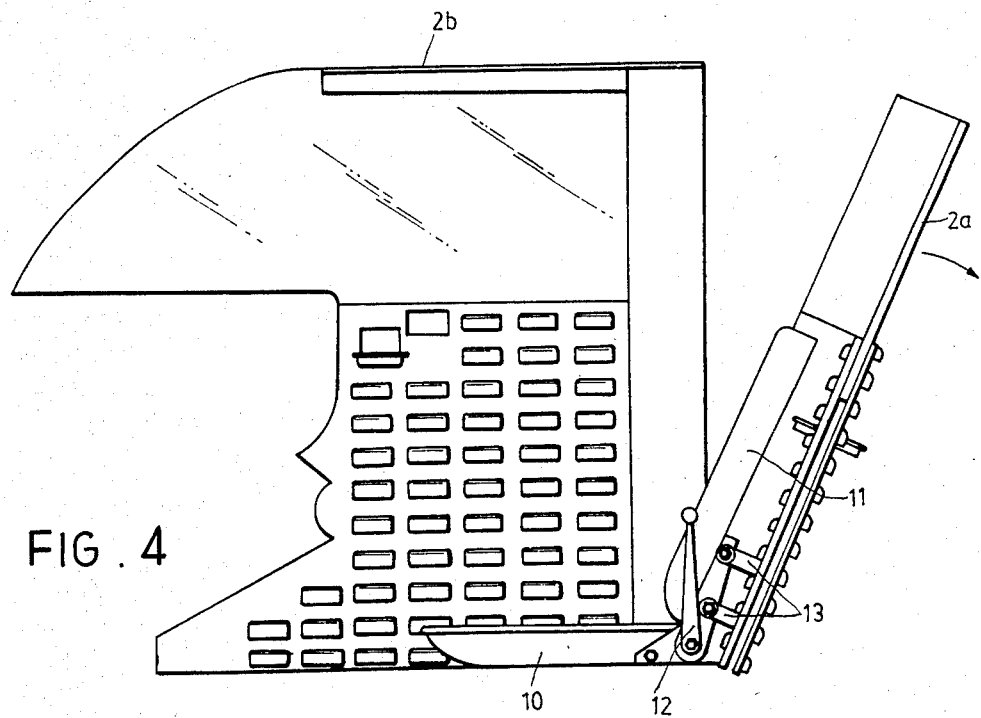
FIG. 4 is a plan view of the arrangement embodying the present invention.

Referring now to FIGS. 1, 2, and 3, the partition member 2a which is provided at the back of the seat 10 is attached to the back 11 by means of two connection plates 13 and the partition member 2b is fixedly mounted on the floor and connected to the top of the car body. Two adjacent portions of the partition members 2a and 2b are separably connected by means of fasteners 3, such as, hooks and the like. As better shown in FIG. 3, the fasteners 30 are provided on both sides of the partition members so that they can be operated by both the driver and the passenger so as to provide a dual control for separating the side and back partition members 2a and 2b.

It is appreciated that the above described arrangement forms a driver compartment in the car body so that the driver's seat will be isolated from the seats of the passengers. Since air ventilation holes 27 and windows 25 are provided, no inconvenience will be caused to the passenger in communicating with the driver or paying the taxi fees or receiving change.

When the driver wants to relax or sleep, he can detach the connecting plate 26 and release the fastener 30 and operate the lever 12 to lower the back 11 and the partition member 2a so as to rearward provide a reclining back-rest.

With the invention thus explained, it is apparent that obvious modifications and variations can be made without departing from the scope of the invention. It is therefore intended that the invention be limited only as indicated in the appended claims.

We claim:

1. A safety compartment for separating the driver's seat from the occupants of a vehicle which comprises
    a driver's seat having a seat portion and a back support portion, said driver's seat being provided with means for causing the back portion to recline toward a horizontal position,
    a side vertical partition member mounted to the floor and to the ceiling at one side of the driver's seat, a rear vertical partition member extending across the back of the driver's seat and extending from the floor to the ceiling and removably connected to the side vertical partition member, said rear vertical partition member being attached to the back support portion of the driver's seat, whereby the side and back partition member surround and separate the driver's seat from the remaining part of the vehicle but when the rear vertical partition member is detached from the side vertical partition member the back support portion of the seat can be placed in a reclining position together with the rear vertical partition member to which it is attached.

2. The safety compartment of claim 4 wherein the rear vertical partition member is slidably connected to the side vertical partition member at the corner of the safety compartment.

3. The safety compartment of claim 2 wherein releasable connecting means are provided at the corner of the safety compartment on the inside and outside thereof.

4. The safety compartment of claim 1 wherein the side and rear partition members are provided with transparent upper wall members and lower, hollow wall members.

5. The safety compartment of claim 4 wherein the lower wall members are provided with a plurality of ventilation apertures, said ventilation apertures having outwardly inclining members associated therewith.

6. The safety compartment of claim 1 wherein the lower wall members are provided with windows and trays for transmitting money and messages between the safety compartment and occupants of the vehicle.

7. The safety compartment of claim 2 wherein at the corner of the safety compartment the side vertical partition member defines a vertical groove for receiving the rear vertical partition member.

* * * * *